United States Patent

Remmers

[11] Patent Number: 5,326,062
[45] Date of Patent: Jul. 5, 1994

[54] SHELF CONNECTOR

[75] Inventor: Lee E. Remmers, Ocala, Fla.

[73] Assignee: Vermont American Corporation, Louisville, Ky.

[21] Appl. No.: 840,888

[22] Filed: Feb. 25, 1992

[51] Int. Cl.$^5$ ............................................. A47G 29/02
[52] U.S. Cl. ................................. 248/250; 211/106; 211/181
[58] Field of Search ............... 248/250, 235; 211/106, 211/181, 182, 187, 90; 108/152, 108, 111; 403/375, 408.1, 191

[56] References Cited

U.S. PATENT DOCUMENTS

| | | | |
|---|---|---|---|
| 2,887,291 | 5/1959 | Holmquist | 248/247 |
| 3,598,064 | 8/1971 | Stempel | 248/249 |
| 3,637,183 | 1/1972 | Sagers | 248/235 |
| 3,765,634 | 10/1973 | Stempel | 248/250 |
| 4,079,678 | 3/1978 | Champagne | 108/144 |
| 4,316,593 | 2/1982 | Miner et al. | 211/90 |
| 4,361,099 | 11/1982 | Kokenge et al. | 248/250 |
| 4,444,321 | 4/1984 | Carlstrom | 248/235 |
| 4,852,839 | 8/1989 | Winter et al. | 248/243 |
| 4,893,772 | 1/1990 | Scott | 248/235 |
| 4,989,817 | 2/1991 | Camilleri | 248/235 |
| 5,027,959 | 7/1991 | Luukkonen | 211/181 |

*Primary Examiner*—Richard K. Seidel
*Assistant Examiner*—Hwei-Siu Payer
*Attorney, Agent, or Firm*—Middleton & Reutlinger

[57] ABSTRACT

The shelf connector of the present invention forms a single bracket for the attachment of shelves to a support frame. The shelf connector can be manufactured from either metal or plastic and adapted for installation on either round or square tubing. The shelf connector of the claimed invention facilitates attachment of shelves to a support frame with the shelf lip in the "up" or "down" position. The shelf connectors may be installed on either the left hand side, right hand side, or centrally located with respect to the support member. After installation, the shelf connector covers the ends of shelves to provide a finished, decorative appearance.

18 Claims, 2 Drawing Sheets

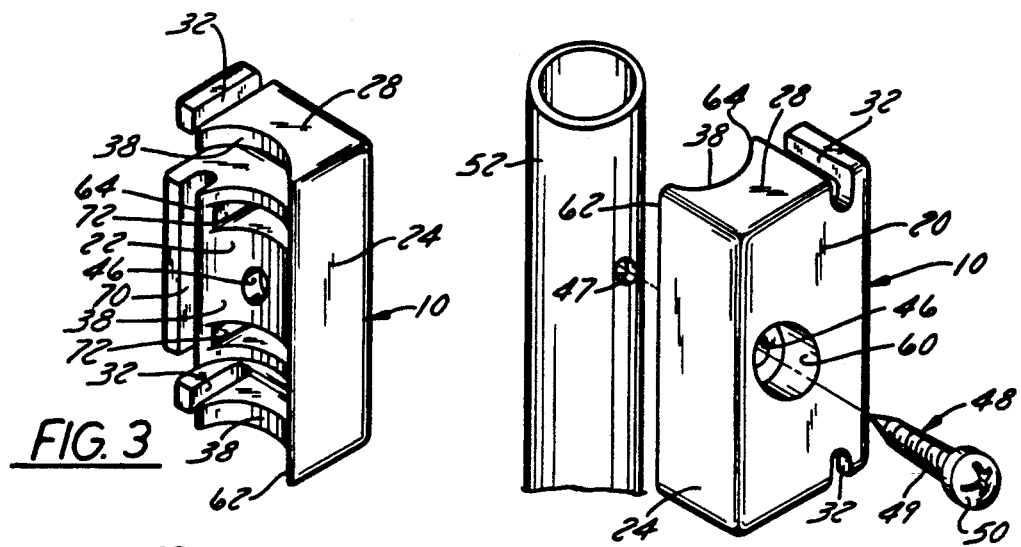
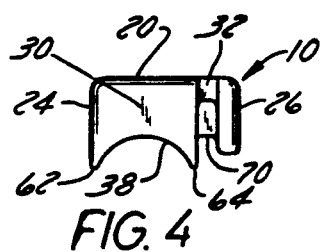
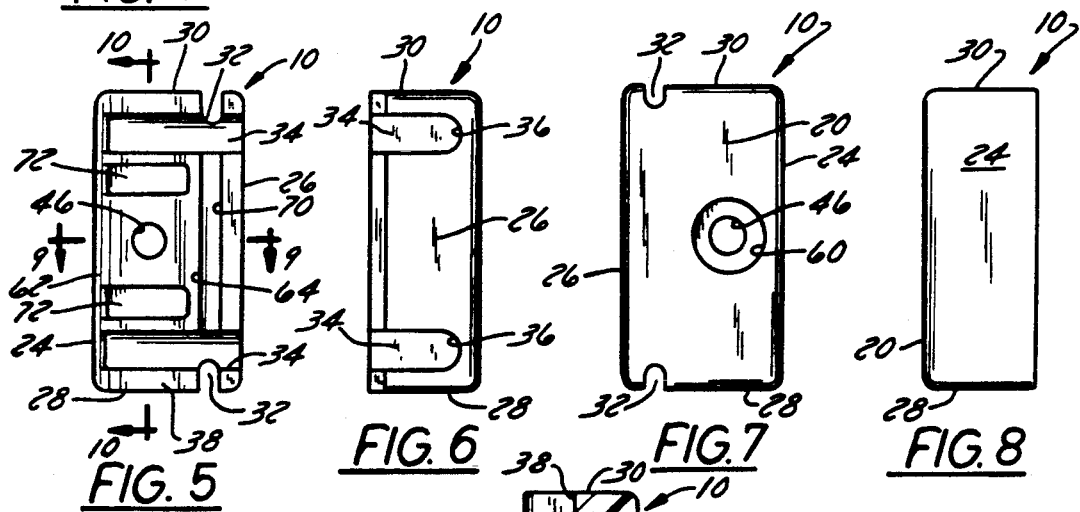
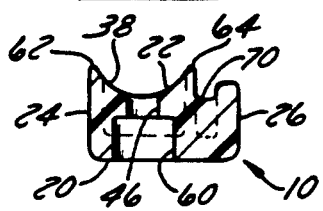
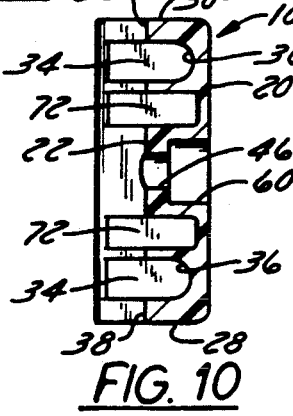

SHELF CONNECTOR

BACKGROUND OF THE INVENTION

The present invention relates to a shelf connector of unitary construction for mounting shelves to a frame. More particularly, the shelf connector claimed and described in the instant application is used to secure and mount metal shelves having a surface composed of a plurality of rods to a plurality of vertical legs of a tubular support frame.

Metal shelving utilizing wires or stringer rods in combination with metal support rods is used in a variety of applications in commercial and home use to provide inexpensive, lightweight, and strong shelving. The shelf support rods for the shelving are often disposed within the frame support members, welded to the support frame, or held to the frame by unsightly screws, and/or other brackets. Shelf rods disposed within the frame members or welded to the frame present problems associated with assembly and disassembly of the shelving for adjustment or removal, and is time consuming and inconvenient. Existing shelving brackets used to support shelving within a frame is unsightly, usually having the screws or projections extending from the bracket for support of the frame.

Accordingly, it is an object of the present invention to provide a novel and improved shelf connector having a plurality of grooves, channels, and slots sized and shaped to fit the individual rods and/or stringer rods supporting a shelf and the frame members supporting the shelf.

It is the object of the present invention to provide a shelf connector having smooth exterior surfaces covering and hiding the attachment means holding the shelving to the frame, so that after installation, the shelf connector covers the ends of shelves to provide a finished, decorative appearance.

Furthermore, it is an object of the present invention to provide a shelf connector to mount a plurality of shelves to a single frame using a shelf connector at each corner of each shelf.

A still further object of the present invention to provide a shelf connector which can be used to mount any single corner of a metal shelf to a support member independent of support means for the other corners of the shelf.

It is yet another object of the present invention to provide a shelf connector which can be manufactured from either metal or plastic and adapted for installation on either round or square tubing.

It is another object of the present invention to facilitate attachment of shelves to a support frame with the shelf lip in the "up" or "down" position so that the shelf connectors may be installed on either the left hand side, right hand side, or centrally located with respect to the support member.

It is yet another object of the present invention to provide a means for incorporating a shelf or shelves as structural support members within a frame to provide free standing shelving.

Furthermore, after installation, the Connector covers the ends of shelves to provide a finished, decorative appearance.

SUMMARY OF THE INVENTION

The present invention is a shelf connector device to be used in a shelving assembly to mount shelves to a frame. The shelf connector includes a front face having a bore therein surrounded by a circular recess. Contiguous with the front face is an outer side wall extending along the longitudinal axis and an inner side wall contiguous with the front face and opposing the outer side wall. The inner side wall is narrower in width than the outer side wall. The shelf connector also has a top and opposing bottom end wall contiguous with the front face, the inner side wall, and the outer side wall. The top and bottom end walls are shorter in width than the side walls. In the preferred embodiment, both the top and bottom end walls have a groove extending therethrough perpendicular to the longitudinal axis, parallel to the outer side wall and positioned near the inner side wall.

The shelf connector of the claimed invention further includes a back surface which is irregular in shape which contains a pair of channels recessed therein. Each channel extends through the inner side wall toward the outer side wall and is adapted for receiving a support rod. A longitudinal slot also extends the entire length of the back surface adjacent to and aligned with the inner side wall and adapted for supporting a stringer rod. In addition, the back surface is formed having a concave depression therein extending along the longitudinal axis. The concave depression is adapted for mounting the shelf connector to a frame support member.

To use the shelf connector, a shelf is mounted to the frame in cooperative relationship securely held into position by the shelf connector. The shelf used in combination with the preferred embodiment of the shelf connector of the present invention includes a plurality of parallel, spaced apart stringer rods arranged in a horizontal plane making up a shelf surface. The stringer rods are attached to at least one end support rod, and at least one intermediate support rod. The intermediate support rod is spaced apart, parallel, and juxtaposed with respect to the end support rod. Both the end support rod and intermediate support rod are disposed in the horizontal plane perpendicular to the stringer rod. The stringer rods are bent downward around the outside of the intermediate support rod and the distal end of each of the stringer rods is attached to the end support rod forming vertical shelf lip.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 2 is an exploded front perspective view of the present invention showing the front face and outer side wall of the shelf connector of FIG. 1 aligned for attachment with a frame support member by means of a screw;

FIG. 3 is a perspective view of the back surface of the shelf connector of FIG. 2 made in accordance with the present invention;

FIG. 4 is an end view showing the shelf connector of FIG. 2 of the present invention;

FIG. 5, is a rear view of the present invention showing the back surface of the shelf connector of FIG. 2;

FIG. 6, is a side view of the present invention showing the inner side wall of the shelf connector of FIG. 5 rotated clockwise and offset 90 degrees on the vertical axis;

FIG. 7, is a front view of the present invention showing the front face of the shelf connector of FIG. 5 rotated clockwise and offset 180 degrees on the vertical axis;

FIG. 8, is a side view of the present invention showing the outer side wall of the shelf connector of FIG. 5 rotated clockwise and offset 270 degrees on the vertical axis;

FIG. 9, is a cross-sectional end view showing the present invention taken along line 9—9 of FIG. 5;

FIG. 10, is a cross-sectional side view showing the present invention taken along line 10—10 of FIG. 5;

Figure 1:
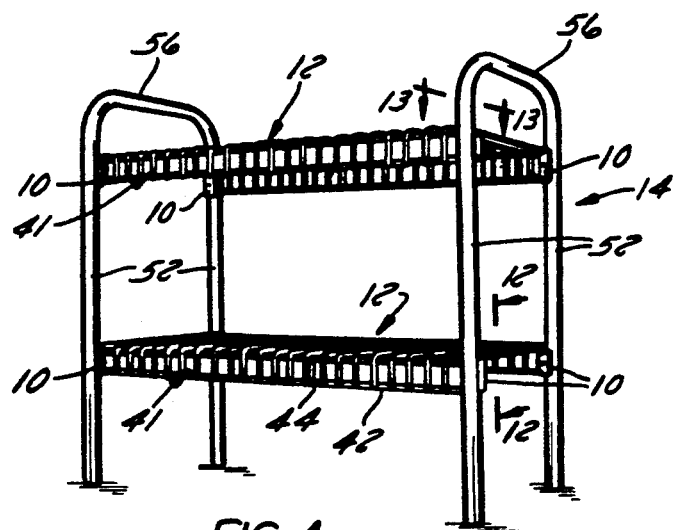
FIG. 1 is a perspective view of a pair of shelves mounted to a frame using the shelf connectors of the present invention wherein the attachment point where the ends of the shelves are connected to the frame are hidden from view.

As shown in the enclosed drawings and particularly FIG. 1, the shelf connector 10 of the present invention is utilized to mount and support a plurality of shelves to a frame. The shelf connector 10 is connecting a pair of standard size metal shelves 12 to an inverted "U-shaped" tubular metal frame having cylindrical support members 52. The shelf connector 10 provides a means for incorporating a shelf 12 or shelves 12 as structural support members within the frame 14 to provide free standing shelving.

As best shown in FIGS. 2–8, the shelf connector 10 of the present is generally rectangular in shape. The shelf connector 10 is formed having a front face 20 which is substantially flat and smooth. FIGS. 2 and 7 show the front face 20 having a screw bore 46 centered with respect to the longitudinal axis, offset with respect to the horizontal axis, surrounded by a circular recess 60 formed into the front face 20 adapted to accommodate a screw head 50. The screw head 50 fits into the recess 60 so that the top surface of screw head 50 is flush with the exterior surface forming the outer front face of the shelf connector 10 during use.

Contiguous with the front face 20 and extending along the longitudinal axis is outer side wall 24 and opposing inner side wall 26. The exterior surface of both the outer side wall 24 and the inner side wall 26 is substantially flat and smooth. The inner side wall 26 is narrower in width than outer side wall 24.

The top end wall 28 and the opposing bottom end wall 30 of the shelf connector 10 are contiguous with the front face 20 and shorter in length than the longitudinal sides 24 and 26. The bottom end wall 30 is essentially a mirror image of the opposing top end wall 28. The exterior surface of the top end wall 28 and bottom end wall 30 are substantially flat and smooth.

A groove 32 is formed in both the top and bottom end walls 28 and 30, respectively, positioned in the horizontal plane, perpendicular to the longitudinal axis, near the inner side wall 26, extending from the front face 20 to the back surface 22 of the shelf connector 10. Each groove 32 is complementary shaped and sized, adapted for receiving a stringer rod 40.

The back surface 22 is irregular in shape formed having grooves 32, channels 34, a longitudinal slot 70, and cavities 72 adapted for supporting the stringer rods 40, end support rods 42, intermediate support rods 44 within the shelf connector 10. The back surface also features a concave depression 38 adapted for attachment of the shelf connector 10 to a tubular shaped support member such as frame leg 52.

The longitudinal, concave depression 38 forms a trough in the back surface 22, offset from the center line and extending through the top end wall 28 and bottom end wall 30 along the entire length of the shelf connector 10, parallel to the longitudinal axis and adjacent the interior of the outer side wall 24. The outer interior edge of the concave depression 38 tapers outward along the edges forming outer edge lip 62 contiguous with the exterior edge of outer side wall 24. The interior edge of the concave depression 38 forms an inner edge lip 64 extending longitudinally along the periphery of the depression 38 and having the same width as outer side edge 24 which is of greater width than inner side wall 26 as illustrated in FIGS. 3 and 5. The longitudinal, concave depression 38 is sized and shaped to be complementary to the tubular frame support member 52. It is contemplated that the concave depression 38 could be shaped and size to receive various shaped frame support members 14 including rectangular, oval, or square cross-sectional frame members of various dimensions.

In the preferred embodiment a bore 46 is formed extending from the back surface 22 to the front face 20 through the center of the concave depression 38 perpendicular to the longitudinal axis between the outer edge lip 62 and inner edge lip 64.

Figure 11:
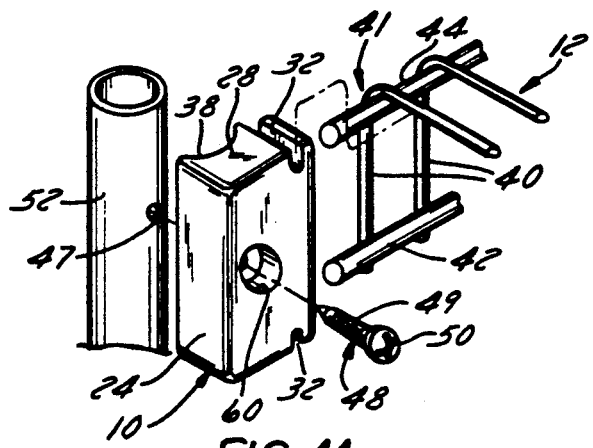
FIG. 11 is an exploded front perspective view of the present invention of FIG. 10, showing one method of connecting horizontal shelf support members to a vertical support member of a frame.
Figure 12:
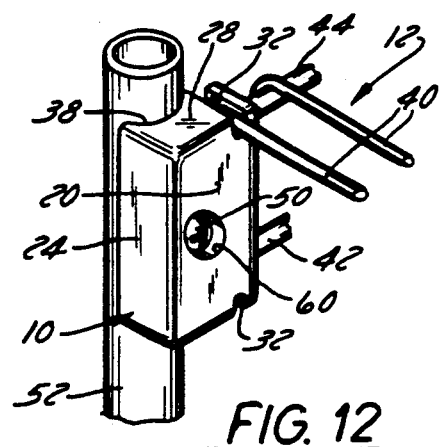
FIG. 12 is an front perspective view of the present invention shown in FIG. 11, showing a pair of shelf support rod members and a stringer member connected to a vertical support member in a manner such that the connection is hidden from view.
Figure 13:
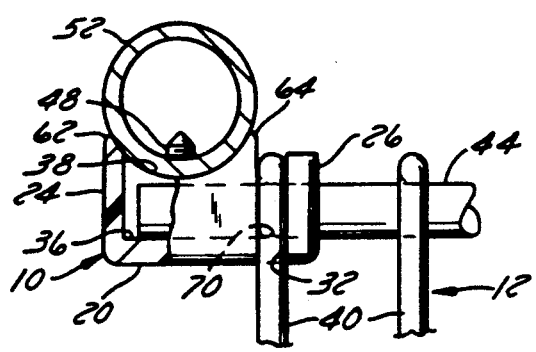
FIG. 13 is a top cut-away view of a shelf mounted to a frame member using the shelf connector of the present invention shown in FIG. 12, showing the structural relationship between the frame support member, the support rods, and the stringer rods positioned with respect to the back surface of the shelf connector.

A longitudinal slot 70 is formed within the back surface 22 parallel and juxtaposed with the concave depression 38 between and contiguous with the inner edge lip 64 and the interior surface of inner side wall 26. The longitudinal slot 70 extends from top end wall 28 the entire length of the back surface 22 to bottom end wall 30. The longitudinal slot 70 is of equal width and in alignment with the grooves 32 in both the top end wall 28 and bottom end wall 30 of the shelf connector 10. The longitudinal slot 70 is complementary shaped and sized to accommodate the portion of the stringer 40 which extends between interior support rod 44 and exterior support rod 42 as shown in FIGS. 11 and 12. FIG. 13 shows that upon assembly, the stringer rod 40 is recessed within longitudinal slot 70 so that the exterior surface of the stringer rod 40 does not extend pass the inner side wall 26 in order to present a substantially smooth surface and appearance, whereby the stringer rod is an integral hidden part of the shelf connector 10.

FIG. 9 shows a cross-sectional end view of the shelf connector 10 shown in FIG. 5 cut along line 9—9 in a plane perpendicular to the longitudinal axis. FIG. 9 shows the concave depression 38 offset from the from the center axis having the bore 46 and recess 60 therein. An end view of the longitudinal slot 70 is also shown, as is the width of the outer edge lip 62, the inner edge lip 64, and the inner side wall 26.

A pair of channels 34 form recesses within the back surface 22, each channel 34 being spaced apart from one another, and each one extending perpendicular to the longitudinal axis through the inner side wall 26 to the outer side wall 24, so that the outside wall of each channel 34 is contiguous with the interior of a top end wall 28 or bottom end wall 30, and the end wall of each of the channels 34 is contiguous with the interior of the outer side wall 24 forming a stop means 36 for the distal end of either end support rod 42 or intermediate support rod 44. The bottom of each channel 34 is contiguous with the interior of the front face 20 and slightly concave being sized and shaped to be complementary to the end support rods 42 or the intermediate support rods 44, both rods having circular cross-sectional areas supported therein. As best shown in the preferred embodiment in FIG. 2, each of the channels 34 intersect the groove 32 in the top end wall 28 or bottom end wall 30 at a ninety degree angle.

A pair of rectangular shaped cavities 72 are formed within the back surface 22, each one being spaced apart from one another equal distance between the bore 46 and channel 34. Each cavity 72 projects inward from the bottom of the concave depression 38 toward the front face 20, and extends perpendicular to the longitudinal axis of the concave depression 38 so that the outer edge lip 62 and inner edge lip 64 form the end walls of the cavities 72, and each of the interior walls of channels 34 form an exterior wall for each of the cavity 72. The cavities 72 serve to reduce the weight of the shelf connector 10 and minimize distortions produced in the plastic during the molding process. However, the shelf connector 10 performs satisfactorily without the cavities 72.

FIG. 10 shows a cross-sectional side view of the shelf connector 10 cut along line 10—10 of FIG. 5 in a plane along the longitudinal axis. The position and depth of the channels 34, cavities 72, bore 46, and recess 60 are shown with respect to the width of the shelf connector 10.

FIGS. 1 and 11-13, show that each shelf 12 is comprised of a plurality of parallel, spaced apart wires or stringer rods 40 making up the shelf surface, supported by a pair of end support rods 42 and a pair of intermediate support rods 44. As shown in the preferred embodiment in FIG. 11, each intermediate support rod 44 is spaced apart, parallel, and juxtaposed with respect to the end support rod 42. The end support rods 42 and intermediate support rods 44 are disposed in the horizontal plane perpendicular to the stringer rods 40. The shelf stringer rods 40 are bent downward around the outside of the intermediate support rods 44 at a ninety degree angle from the horizontal plane to the vertical plane. The distal end of each stringer rod 40 is welded to the outside surface of the intermediate support rod 44 and the end support rod 42 forming a vertical shelf lip 41.

The tubular frame shown in FIG. 1 is comprised of a pair of shelves 12 connected to four vertical frame legs 52. In the preferred embodiment a single length of tubing or pipe is bent in the vertical plane at a ninety degree angle at two points which are space apart from one another forming a "U-shaped" frame 14 having a width equal to the width of the shelves 12. The ends of the frame legs 52 are supported by the floor surface. Attachment of the shelves at a selected position below the "U-shaped" portion of the frame provides for the "U-shaped" portion of the frame 14 to form a pair of top end support rails 56 for objects placed on the top shelf 12.

FIG. 2 illustrates the method of mounting the shelf connector 10 onto the tubular frame 14, wherein a bore 47 is drilled in the frame 14 at the desired shelf height. A screw 48 extends through the shelf connector 10, so that the screw shank 49 threadably engages the frame hole 47. The screw head 50 fits in the recess 60 so that the top surface of screw head 50 is flush with the exterior surface forming the outer front face 22 of the shelf connector 10.

FIG. 13 shows a top view of the shelf connector 10 in cooperative relationship with the shelf 12 and frame leg 52. The shelf connector 10 is mounted with its flat front face 20 and outer side wall 24 facing outward, with both the end support rod 42, intermediate support rod 44, and stringer rod 40 firmly secured in place within back surface 22 of the shelf connector 10. As shown in the preferred embodiment, end support rod 42 is inserted in "top" channel 34 simultaneously as intermediate support rod 44 is inserted in "bottom" channel 34 of the back surface 22. The outermost or "outside" stringer rod 40 is then positioned in grooves 32 and longitudinal slot 70 within the back surface 22. The screw 48 is then used to securely fasten the shelf connector 10 to the tubular frame leg 52 so that the concave depression 38 in the back surface 22 is contiguous with the frame leg 52.

The shelf connector 10 of the preferred embodiment is manufactured via injection molding of a thermoplastic polymer, more particularly, nylon. However, it is contemplated that the shelf connector 10 can be produced using other plastics by molding and/or extrusion processes, or produced from metal die casting techniques. The shelf connector 10 may be manufactured in a variety of sizes depending upon the application of use. The shelving connector can be used to mount shelving 12 or frames 14 manufactured from either plastic or metal.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims.

I claim:

1. A shelf connector device comprising:
   a front face having a bore therein with a longitudinal axis therethrough;
   an outer side wall contiguous with said front face, extending along the longitudinal axis;
   an inner side wall contiguous with said front face opposing said outer side wall, said inner side wall being narrower in width than said outer said side wall;
   a top end wall contiguous with said front face, and contiguous and shorter in length than said inner side wall and said outer side wall;
   a bottom end wall opposing said top end wall, said bottom end wall being contiguous with said front face, said inner side wall, and said outer side wall, said bottom end wall being of the same width and length of said top end wall;
   a back surface being irregular in shape formed having at least one channel, and a longitudinal slot, said back surface being adapted for supporting at least one stringer rod and at least one support rod of a shelf, said back surface having a depression therein adapted for mounting said shelf connector to a frame support member; and at least one of said top end wall and said bottom end wall having a groove formed therein, said groove being positioned in a horizontal plane, perpendicular to a longitudinal axis of said shelf connector, near said inner side wall, and extending from said front face toward said back surface of said shelf connector.

2. The shelf connector as recited in claim 1, said front face including a circular recess surrounding said bore.

3. The shelf connector device recited in claim 1, wherein said groove is complementary shaped and sized, adapted for receiving said stringer rod.

4. The shelf connector device as recited in claim 1, wherein said depression being formed extending along the entire length of said back surface adjacent said outer side wall through said top end wall and said bottom end wall, being positioned offset and parallel to the longitudinal axis of said shelf connector.

5. The shelf connector device recited in claim 4, said depression including an outer edge lip tapering outward contiguous with the exterior edge of said outer side wall, and an inner edge lip extending longitudinally along the periphery of said depression, said inner edge lip having the same width as said outer side edge greater than said inner side wall.

6. The shelf connector device as recited in claim 4, wherein said depression is formed being sized and shaped to receive various shaped frame support members including rectangular, oval, or square cross-sectional frame members of various dimensions.

7. The shelf connector device as recited in claim 6, wherein said depression is concave.

8. The shelf connector device as recited in claim 1, wherein said bore extends through said back surface and through the center of said depression perpendicular to the longitudinal axis, between an outer edge lip and an inner edge lip of said depression and exiting said front face.

9. The shelf connector device as recited in claim 1, wherein said longitudinal slot is formed within said back surface parallel and juxtaposed to said depression between and contiguous with an inner edge lip of said depression and said inner side wall, said longitudinal slot extending intermediate said top end wall and said bottom end wall, said longitudinal slot being of equal width and in alignment with said groove.

10. The shelf connector device as recited in claim 9, wherein said longitudinal slot is complementary shaped and sized to accommodate said stringer rod, so that said stringer rod is recessed within said longitudinal slot presenting a substantially smooth surface appearance.

11. The shelf connector device as recited in claim 1, wherein said channel is recessed within said back surface, said channel extending perpendicular to the longitudinal axis through said inner side wall to said outer side wall, said channel being contiguous with either said top end wall or said bottom end wall, said channel having an interior end wall contiguous with said outer side wall forming a stop means for a distal end of a support rod.

12. The shelf connector of claim 11, wherein said channel has a slightly concave bottom surface contiguous with said front face being sized and shaped complementary to said support rod being supported therein.

13. The shelf connector of claim 11, wherein said back surface is formed having a pair of channels spaced apart parallel and opposing one another, wherein one of said channels is positioned contiguous with said top end wall and one of said channels is contiguous with said bottom end wall.

14. The shelf connector device of claim 1, further comprising at least one cavity formed within said back surface.

15. The shelf connector device of claim 14, wherein said back surface is formed having a pair of rectangular shaped cavities, each one being spaced apart from one another equal distance between said bore and said channel, each cavity projecting inward from said depression toward said front face, extending perpendicular to the longitudinal axis of said depression.

16. The shelf connector device of claim 1, wherein said front face, said outer side wall, said inner side wall, said top end wall, and said bottom end wall have a generally smooth surface.

17. A shelf connector device comprising:
a front face having a bore therein surrounded by a circular recess;
an outer side wall contiguous with said front face, extending along a longitudinal axis of said front face;
an inner side wall contiguous with said front face opposing said outer side wall, said inner side wall being narrower in width than said outer side wall;
a top end wall contiguous with said front face, and contiguous and shorter in length than said inner side wall and said outer side wall, said top end wall having a groove extending therethrough perpendicular to the longitudinal axis, parallel to the outer side wall near said inner side wall;
a bottom end wall opposing said top end wall, said bottom end wall being contiguous with said front face, said inner side wall, and said outer side wall, said bottom end wall of the same width and length as said top end wall, said bottom end wall having a groove extending therethrough perpendicular to the longitudinal axis, parallel to the outer side wall near said inner side wall; and
a back surface being irregular in shape containing a pair of channels recessed within said back surface each one of said channels extending through said inner side wall toward said outer side wall for receiving a support rod, a longitudinal slot extending the entire length of said back surface adjacent to and aligned with said inner side wall and adapted for supporting a stringer rod, said back surface having a concave depression therein extending along the longitudinal axis adapted for mounting said shelf connector to a frame support member.

18. A shelving assembly comprising:
a) a shelf connector device including
a front face having a bore therein surrounded by a circular recess;
an outer side wall contiguous with said front face, extending along a longitudinal axis of said front face;
an inner side wall contiguous with said front face opposing said outer side wall, said inner side wall being narrower in width than said outer side wall;
a top end wall contiguous with said front face, and contiguous and shorter in length than said inner side wall and said outer side wall, said top end wall having a groove extending therethrough perpendicular to the longitudinal axis, parallel of the outer side wall near said inner side wall;

a bottom end wall opposing said top end wall, said bottom end wall being contiguous with said front face, said inner side wall, and said outer side wall, said bottom end wall having a groove extending therethrough perpendicular to the longitudinal axis, parallel to the outer side wall near said inner side wall;

a back surface being irregular in shape containing a pair of channels recessed within said back surface, each one of said channels extending through said inner side wall toward said outer side wall for receiving a support rod, a longitudinal slot extending the entire length of said back surface adjacent to the aligned with said inner side wall and adapted for supporting a stringer rod, said back surface having a concave depression therein extending along the longitudinal axis adapted for mounting said shelf connector to a frame support member;

b) a frame having at least one support member; and c) at least one shelf mounted to said frame connected by said shelf connector, said shelf comprising a plurality of parallel, spaced apart stringer rods arranged in a horizontal plane making up a shelf surface, each one of said stringer rods being attached to at least one end support rod, and at least one intermediate support rod, said intermediate support rod being spaced apart, parallel, and juxtaposed with respect to said end support rod, said end support rod and intermediate support rod being disposed in a horizontal plane perpendicular to said stringer rods, said each one of said stringer rods having a distal end portion bent downward around said intermediate support rod and attached to said end support rod forming a vertical shelf lip.

* * * * *